(12) United States Patent
Koteich et al.

(10) Patent No.: US 11,362,583 B2
(45) Date of Patent: Jun. 14, 2022

(54) METHOD FOR CONTROLLING A VIENNA RECTIFIER

(71) Applicant: Renault s.a.s., Boulogne-Billancourt (FR)

(72) Inventors: Mohamad Koteich, Bures sur yvette (FR); Nadim Sakr, Paris (FR); Najib Rouhana, Massy (FR)

(73) Assignee: Renault s.a.s., Boulogne-Billancourt (FR)

( * ) Notice: Subject to any disclaimer, the term of this patent is extended or adjusted under 35 U.S.C. 154(b) by 8 days.

(21) Appl. No.: 17/252,127

(22) PCT Filed: May 27, 2019

(86) PCT No.: PCT/EP2019/063686
§ 371 (c)(1),
(2) Date: Dec. 14, 2020

(87) PCT Pub. No.: WO2019/238404
PCT Pub. Date: Dec. 19, 2019

(65) Prior Publication Data
US 2021/0257904 A1    Aug. 19, 2021

(30) Foreign Application Priority Data
Jun. 15, 2018  (FR) .................... 18 55285

(51) Int. Cl.
*H02M 1/42* (2007.01)
*H02M 7/219* (2006.01)
(Continued)

(52) U.S. Cl.
CPC ....... *H02M 1/4216* (2013.01); *H02M 1/0085* (2021.05); *H02M 1/12* (2013.01); *H02M 7/219* (2013.01)

(58) Field of Classification Search
CPC ........ H02M 1/12; H02M 1/0085; H02M 1/42; H02M 1/4208; H02M 7/219
See application file for complete search history.

(56) References Cited

U.S. PATENT DOCUMENTS

| 8,971,068 B2 | 3/2015 | Pu et al. |
| 2006/0215425 A1* | 9/2006 | Fu .................. H02M 7/219 |
| | | 363/37 |

(Continued)

FOREIGN PATENT DOCUMENTS

| CN | 103227575 A | 7/2013 |
| CN | 104811061 A | 7/2015 |

(Continued)

OTHER PUBLICATIONS

International Search Report dated Oct. 1, 2019 in PCT/EP2019/063686 filed on May 27, 2019, 1 page.

(Continued)

*Primary Examiner* — Gary L Laxton
(74) *Attorney, Agent, or Firm* — Oblon, McClelland, Maier & Neustadt, L.L.P.

(57) ABSTRACT

A method for generating a current set point value for a charging device connected to an electrical network includes measuring at least one electrical voltage, calculating a filtered voltage according to the measured voltage and a value of electrical pulsation of the electrical network, estimating a frequency and the amplitude of the measured voltage according to the at least one measured voltage and the at least one filtered voltage, calculating a consolidated voltage according to the measured voltage and the filtered voltage, and generating a current set point value according to the consolidated voltage and the estimated amplitude.

10 Claims, 4 Drawing Sheets

(51) Int. Cl.
*H02M 1/00* (2006.01)
*H02M 1/12* (2006.01)

(56) References Cited

U.S. PATENT DOCUMENTS

| | | | | |
|---|---|---|---|---|
| 2009/0040800 A1* | 2/2009 | Sonnaillon | .......... | H02M 7/1626 363/127 |
| 2010/0073975 A1* | 3/2010 | Ha | .......... | H02M 1/4216 363/89 |
| 2012/0257427 A1* | 10/2012 | Fattal | .......... | H02M 7/219 363/84 |
| 2015/0349654 A1* | 12/2015 | Wang | .......... | H02M 1/4216 363/37 |
| 2015/0357930 A1* | 12/2015 | White | .......... | H02M 7/217 363/89 |
| 2016/0268920 A1* | 9/2016 | Nieberlein | .......... | H02M 1/4216 |
| 2019/0245432 A1* | 8/2019 | Yan | .......... | H02M 1/08 |
| 2019/0288539 A1* | 9/2019 | Vela Garcia | .......... | H02J 7/0072 |

FOREIGN PATENT DOCUMENTS

| | | |
|---|---|---|
| CN | 103187887 B | 12/2015 |
| EP | 0 660 498 A2 | 6/1995 |
| EP | 2 461 469 A2 | 6/2012 |
| EP | 2 461 469 A3 | 6/2012 |
| FR | 3 056 851 A1 | 3/2018 |
| KR | 10-1250454 B1 | 4/2013 |

OTHER PUBLICATIONS

Zhang M. et al., "A Novel Strategy for Three-Phase/Switch/Level (Vienna) Rectifier Under Severe Unbalanced Grids", IEEE Transactions of Industrial Electronics, vol. 60, No. 10, Oct. 2013, XP011510491A, pp. 4243-4252, 10 total pages.

Liu, S. et al., "A Novel Strategy for Vienna-type Rectifier With Light Unbalanced Input Voltage", IEEE Energy Conversion Congress and Exposition, Sep. 2013, XP032516359A, pp. 4253-4257, 5 total pages.

* cited by examiner

METHOD FOR CONTROLLING A VIENNA RECTIFIER

The present invention relates to a method for controlling a rectifier for a single-phase or three-phase input charging device, comprising an isolated AC-to-DC (AC current to DC current) converter. Such a charging device is particularly suitable for use as an on-board device in an electric or hybrid motor vehicle.

These vehicles are equipped with high-voltage electric batteries and generally comprise on-board chargers, that is to say electric battery-charging devices that are installed directly in the vehicles. The main function of these charging devices is that of recharging batteries from the electricity available on the electricity distribution grid.

They therefore convert an AC current into a DC current. The desired criteria for charging devices, and more particularly for on-board chargers, are high efficiency, low bulk, galvanic isolation, good reliability, operational safety, low electromagnetic interference emission and a low harmonic level on the input current.

The object of the invention applies to single-phase and three-phase charging devices. By way of illustration, FIG. 1 illustrates a known topology of an isolated charging device 10 on board an electric or hybrid vehicle for recharging the high-voltage battery of the vehicle from the three-phase electricity grid 30 to which the on-board charging device 10 is connected by way of the line impedance 40 of the grid. Such a topology may be adapted for a single-phase charging device.

In order to implement the AC-to-DC conversion function with galvanic isolation, it is known to use a charging device 10 comprising a first AC-to-DC converter that has a power factor correction (PFC) circuit 20 in order to limit the input current harmonics, and a second DC-to-DC converter (DC current to DC current) 12 for controlling the charging and also for providing the isolation function for safety of use. An input filter 13 is conventionally integrated at the input of the on-board charging device 10, upstream of the PFC circuit 20 with respect to the three-phase electricity grid 30.

The PFC circuit 20 is controlled by an integrated controller (not shown), which analyzes and corrects the trend of the current with respect to the voltage in real time. From this, it deduces form errors through a comparison with the rectified sinusoid of the voltage and it corrects them by controlling the amount of energy through high-frequency chopping and storing energy in an inductor. Its role is more precisely that of achieving a current that is not phase-offset and is as sinusoidal as possible at the input of the power supply of the charger.

For the PFC circuit 20, it is known, in particular from prior art document CN104811061, to use a three-level three-phase rectifier with three switches, commonly known under the name three-phase Vienna rectifier, as described in prior art document EP94120245 and in FIG. 2.

Choosing this topology is specifically particularly advantageous from the point of view of performance for the power factor correction.

In a three-phase Vienna rectifier 20, each phase of the three-phase AC input voltage 30 is connected by respective inductors La, Lb, Lc to a switching arm 1, 2, 3 of the rectifier 20, which is provided with a cell of power switches, respectively Sa, Sb, Sc.

The cells of power switches Sa, Sb, Sc are each positioned between a respective inductor La, Lb, Lc and a center tap O between the two output voltages $V_{DCH}$ and $V_{DCL}$ of the rectifier 20, corresponding respectively to the voltage on a first output capacitor C1 connected between the center tap O and a positive power supply line H and to the voltage on a second output capacitor C2 connected between the center tap O and a negative power supply line L.

Generally, in order to control such a Vienna rectifier 20, the voltages and the currents at the input of each switch Sa, Sb, Sc and at the output of the rectifier are measured, and control loops are used to generate duty cycles required to control the average on time of the switches Sa, Sb, Sc.

However, one problem with this type of structure is that, when the measured voltages are impacted by harmonics or imbalances, it is not possible to ensure optimum generation of the current target values and the generation of the active power target values is unreliable.

The problems with imbalances in measured voltages are known, in particular through document CN 103187887 B, which describes a controller for a Vienna rectifier using a sinusoidal target value, but does not disclose any solution to these problems.

Document U.S. Pat. No. 8,971,068 B2 describes a means for suppressing the various harmonics resulting from a high-voltage three-phase unidirectional rectifier in order to comply with or get close to a predetermined threshold for the absolute value of the phase difference between the input voltage of the AC current and of the phase current of the unidirectional rectifier. However, this document U.S. Pat. No. 8,971,068 B2 does not describe any possibility of providing a particular instantaneous active power target value.

Similarly, other known documents, such as CN 104811061 A, CN 103227575 A and KR 101250454 B1 describe rectifiers with reactive power compensation without however disclosing current target values.

Document EP 2 461 469 A3 proposes a system capable of generating the DC current target values in a rotating reference frame. However, it has the drawback of using an additional variable, such as the phase of the rotating reference frame, in order to control a rectifier so as to generate the output signals.

The invention therefore aims to generate current target values in order to provide an active power target value from voltages of a three-phase or single-phase electricity grid, in a manner reliable enough to overcome the imbalances or the harmonics that interfere with the electricity grid.

Document FR3056851 is in particular known, this disclosing a method for generating filtered current target values so as to provide an active power target value from voltages of a three-phase electricity grid and aimed at overcoming the imbalances in the electricity grid.

However, such a solution cannot be applied to a single-phase charger. Furthermore, it exhibits unsatisfactory behavior at the zero-crossing of the voltage and does not make it possible to estimate the frequency and the amplitude of the grid voltage, such that the power and the performance of the controller remain relatively imprecise.

There is therefore the need for a method for generating current target values in order to solve the prior-art problems outlined above.

What is proposed is a method for generating a current target value for a charging device connected to an electricity grid, comprising:
- a step of measuring at least one voltage;
- a filtering step, in which at least one filtered voltage is calculated on the basis of said at least one measured voltage and a value of the electrical angular frequency of the electricity grid;

a step of estimating a frequency and the amplitude of said at least one measured voltage on the basis of said at least one measured voltage and said at least one filtered voltage;

a consolidation step, in which a consolidated voltage is calculated on the basis of said at least one measured voltage and said filtered voltage; and a step of generating a current target value on the basis of said consolidated voltage and the estimated amplitude.

It is thus possible to achieve current control for the Vienna rectifier that is able to be adapted both to a three-phase grid or to a single-phase grid, and more generally to any N-phase grid, furthermore being able to ensure relatively correct control in spite of an imbalance in the grid and the presence of harmonics, in a relatively fast and reliable manner.

This method furthermore makes it possible to provide control having relatively optimum behavior during the zero-crossing of the voltages.

Advantageously and without limitation, the method is implemented several successive times, and said value of the electrical angular frequency of the filtering step is determined on the basis of a frequency estimated in a previous implementation. It is thus possible to determine the electrical angular frequency relatively effectively through the previous measurement of an estimated frequency.

Advantageously and without limitation, the measurement step comprises measuring the phase voltages of the three-phase grid; and a step of calculating the measured voltages in a two-phase reference frame. It is thus relatively easily possible to simplify the complexity and the required calculation time. For example, this calculation in a two-phase reference frame may comprise a Clarke transformation or a Concordia transformation.

Advantageously and without limitation, the method comprises:

a step of extracting the forward components of the filtered voltages;

said estimation step furthermore being based on said extracted forward components. It is thus possible to make the current control even more effective and precise.

Advantageously and without limitation, the consolidation step is furthermore based on values of amplitude thresholds. It is thus possible to limit the consolidated value so as to prevent potentially incorrect or undesired values.

The invention also relates to a device for controlling a charging device connected to an electricity grid in order to implement the method as described above, which device comprises:

means for measuring at least one voltage;

means for filtering said at least one measured voltage on the basis of a value of an electrical angular frequency of the electricity grid;

means for estimating a frequency and the amplitude of said at least one measured voltage on the basis of said at least one measured voltage and said at least one filtered voltage;

means for consolidating said at least one measured voltage on the basis of said at least one measured voltage and said at least one filtered voltage; and means for generating a current target value on the basis of said consolidated voltage and the estimated amplitude.

The invention also relates to an assembly for recharging a battery of electrical accumulators and intended to be connected to an electricity grid, having a power factor correction circuit, a DC-to-DC converter, a battery of electrical accumulators and a control device according to the invention.

Advantageously and without limitation, the power factor correction circuit comprises a Vienna rectifier.

Advantageously and without limitation, the recharging assembly is connected to a three-phase or single-phase electricity grid.

The invention also relates to a motor vehicle comprising a recharging assembly as described above.

Other features and advantages of the invention will become apparent on reading the description given below of one particular embodiment of the invention, given by way of indication but without limitation, with reference to the appended drawings, in which:

FIG. 2 shows the structure of a three-phase Vienna rectifier 20 known from the prior art, as used in the invention.

Figure 1:
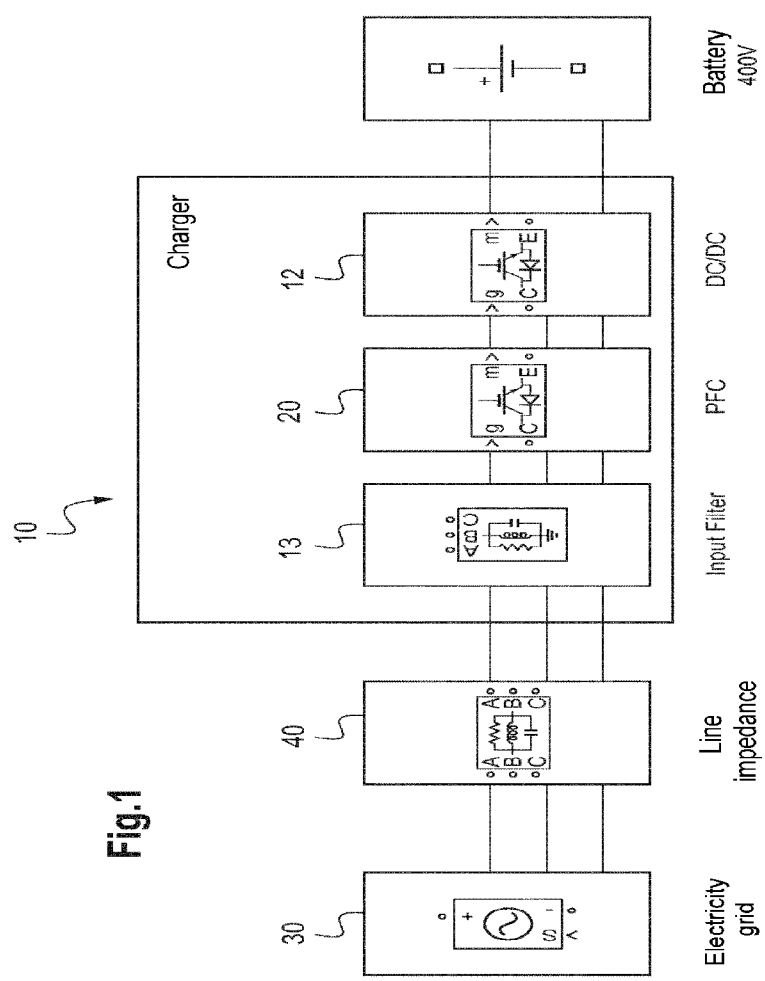
FIG. 1 shows a voltage converter implementing a method according to one embodiment of the invention shown in FIG. 3.
Figure 2:
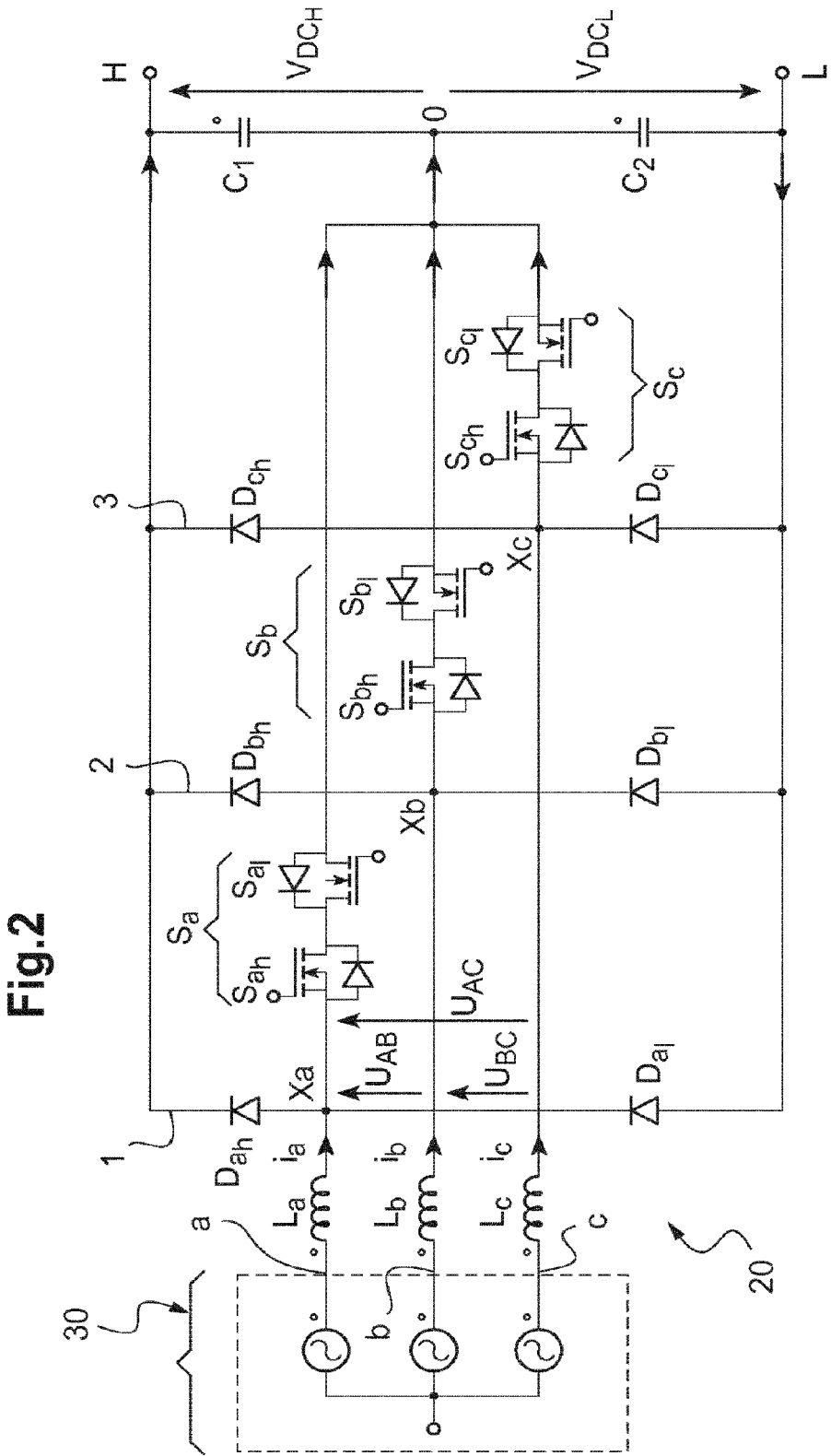
FIG. 2 shows a three-phase Vienna rectifier known from the prior art.

The three-phase Vienna rectifier 2 comprises three parallel inbound connections each coupled to a phase of a three-phase electricity supply grid 30 by way of a series inductor coil La, Lb, Lc, and each connected to a pair of switches Sa, Sb, Sc forming a first, a second and a third switching arm of the three-phase Vienna rectifier.

Each pair of switches Sa, Sb, Sc comprises a head-to-tail series assembly consisting of a first corresponding switch Sah, Sbh, Sch that is driven when a corresponding input current $i_a$, $i_b$, $i_c$ is positive, and of a second corresponding switch Sal, Sbl, Scl that is driven when the corresponding input current is negative. In other words, a single switch driven on a switching branch is used to chop the current. The switches are formed by semiconductor components that are controlled in terms of closing and opening, such as SiC-MOS (acronym for silicon-carbide metal-oxide semiconductor) transistors connected in antiparallel with a diode. This type of semiconductor is suitable for very high chopping frequencies. The switches Sah, Sbh, Sch are also called high-side switches, and the switches Sal, Sbl, Scl are also called low-side switches.

The three-phase Vienna rectifier 20 also comprises three parallel branches 1, 2 and 3, each having two diodes Dah and Dal, Dbh and Dbl and Dch and Dcl, which form a six-diode three-phase bridge for the unidirectional transfer of energy and for rectifying the current and the voltage that are drawn from the three-phase electricity supply grid 30.

Each input of the three-phase Vienna rectifier 20 is connected, by way of a respective parallel inbound connection, to a connection point situated between two diodes of the same branch 1, 2 and 3.

The two common ends of the branches 1, 2 and 3 form two output terminals H and L, respectively positive H and negative L, of the three-phase Vienna rectifier 20, which are intended to be coupled to the DC-to-DC device 12.

The switching arms Sa, Sb, Sc of each phase are moreover each connected respectively between the connection point a, b, c situated between the two diodes of the first 1, second 3 and third 3 branches and a center tap O of the output voltages $V_{DCH}$ and $V_{DCL}$ of the three-phase Vienna rectifier 20, corresponding respectively to the voltage on an output capacitor C1 between the positive output terminal H of the three-phase rectifier and the center tap O and to the voltage on an output capacitor C2 between the center tap O and a negative output terminal L of the three-phase rectifier 20.

The voltage on the output capacitors C1, C2 is slaved independently by the DC-to-DC converter of the charging device connected at the output of the three-phase Vienna rectifier 20, according to the overall topology illustrated in FIG. 1. In other words, the output voltages of the three-phase Vienna rectifier 20 are controlled by the DC-to-DC converter 12.

The three-phase Vienna rectifier 20 inserted at the input of the power supply of the charger 10 takes on the role of correcting the power factor of the charger. Such a role makes it possible to prevent interfering currents (harmonics) produced by the charger from flowing through the impedance of the grid, situated upstream of the Vienna rectifier 20.

The switching arms Sa, Sb and Sc of each phase of the three-phase grid 30 are controlled by way of six PWM (from pulse width modulation) control signals having a variable duty cycle with a fixed chopping frequency equal to 140 kHz, individually controlled for example by FPGA processing means (not shown) for high sampling frequencies.

The processing means are thus suitable for determining the duty cycles of the signals for controlling the switching of the switches of the switching arms of the rectifier that are necessary for slaving the sinusoidal currents at the input of the rectifier.

The processing means implement a control method suitable for controlling said Vienna rectifier.

The control method according to the invention comprises a step of measuring 61 the phase voltages of the electricity grid, a step of filtering 62 the measured voltage, a step of estimating 63 the frequency $f_G$ and the amplitude $V_G$ of the current of the electricity grid, a step of consolidating 64 the measured voltage and a step of generating 65 the current target values.

In a first embodiment of the invention, comprising a three-phase charging device, the phase voltages $v_a^{meas}$, $v_b^{meas}$, $v_c^{meas}$ of each electrical phase are measured.

A step of filtering 62 the measured voltages is then implemented.

The purpose of the filtering is to extract a frequency component of a noisy signal. A filter as illustrated in FIG. 3 is implemented in this embodiment, on the basis of the measured voltage components transformed into the Clarke domain, the electrical angular frequency of the grid voltage $\omega_G$ (corresponding to $2\pi f_G$ where $f_G$ is the frequency of the grid voltage) and comprising an adjustment gain Kl, two multipliers x, two integrators 1/s and two additions, according to the logic layout proposed in FIG. 3.

Figure 3:
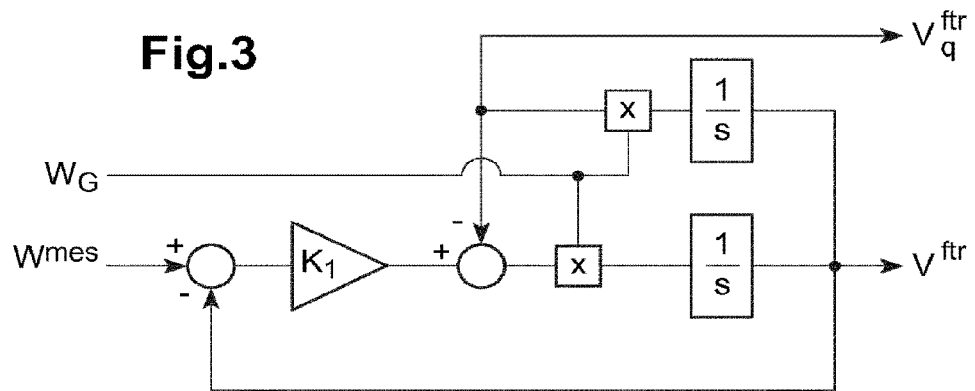
FIG. 3 shows a step of filtering a measured voltage according to the invention.

The filter according to FIG. 3 has the advantage of being relatively simple to implement and having relatively low computational complexity. It allows a relatively good compromise between speed and filtering precision. By way of example, to filter a frequency of 50 Hz, this filter provides a response time of less than 100 ms and very good precision in steady state operation.

Furthermore, such a filter makes it possible to generate a signal in quadrature with respect to the input signal (+90° phase offset), this being particularly suitable for the method according to the invention, and in particular for implementing steps such as:
estimating 63 the frequency and the amplitude of the input signal,
estimating the reverse component 621 of the voltage in the three-phase case; and also
the method for controlling the charger according to the second embodiment, with a single-phase grid.

The invention is however not limited to this filtering alone, and any other suitable filtering could be used.

To apply this filter to a three-phase grid, the three-phase phase voltage $v_a^{meas}$, $v_b^{meas}$, $v_c^{meas}$ is first of all measured for each phase or, according to one alternative, it is calculated from the measurement of the phase-to-phase three-phase voltages.

Next, the components α and β of the voltage are calculated 611 by applying a Clarke transformation (three-phase to two-phase).

The Clarke transformation makes it possible to convert the calculations performed on the measured voltages from three dimensions (the phase voltages Va, Vb and Vc for example) to two dimensions in the reference frame α, β. Therefore, in the remainder of this embodiment, for a three-phase grid, any reference made in particular to the measured voltages and to the filtered voltages should be understood as being considered in the reference frame α, β.

The filter is then applied to each voltage component vα, vβ in order to generate the filtered voltages $v_\alpha^{ftr}$ and $v_\beta^{ftr}$, from which their respective quadrature components $v_{q\alpha}^{ftr}$ and $v_{q\beta}^{ftr}$ are deduced.

However, if the grid is imbalanced, the quadrature component of a is not always aligned with β. These quantities match in the case of a balanced grid. In other words, the coherency of the reference frame α, β is dependent on the balance between the measured phases, this being a well-known criterion of the Clarke transform.

Advantage is thus taken of the estimation of the quadrature components so as to separate the imbalance (reverse component) from the main signal (forward component).

In order to separate the imbalance from the main signal, a step of extracting 621 the forward component and the reverse component from the three-phase voltages is implemented.

Specifically, it is known that an imbalanced three-phase voltage may be seen as being the sum of 3 components:
the forward component: balanced three-phase voltage of the same sequence as the original voltage;
the reverse component: balanced three-phase voltage of the opposite sequence to the original voltage; and
the homopolar component: balanced three-phase voltage having the 3 components in phase (zero sequence, no phase offset between the 3 phases).

The components αβ of the forward component of the filtered voltages are calculated using the system of equations:

$$v_{\alpha p}^{ftr} = \frac{1}{2} v_\alpha^{ftr} - \frac{1}{2} v_{q\beta}^{ftr}$$

$$v_{\beta p}^{ftr} = \frac{1}{2} v_\beta^{ftr} + \frac{1}{2} v_{q\alpha}^{ftr}$$

The index p corresponds to a forward component (positive sequence).

The components αβ of the reverse component of the filtered voltages are calculated using the system of equations:

$$v_{\alpha n}^{ftr} = \frac{1}{2}v_{\alpha}^{ftr} - \frac{1}{2}v_{q\beta}^{ftr}$$

$$v_{\beta n}^{ftr} = \frac{1}{2}v_{\beta}^{ftr} + \frac{1}{2}v_{q\alpha}^{ftr}$$

The index n indicates that this is a reverse component (negative sequence).

The inverse Clarke transformation is then applied in order to calculate the forward ($v_{ap}^{ftr}$, $v_{bp}^{ftr}$, and $v_{cp}^{ftr}$) and reverse ($v_{an}^{ftr}$, $v_{bn}^{ftr}$ and $v_{cn}^{ftr}$) three-phase voltages.

The calculation of the homopolar component corresponds to ⅓ of the sum of the three-phase phase voltages.

A step of estimating 63 the frequency $f_G$ and the amplitude $V_G$ is then implemented on the basis of the voltages measured in the reference frame β, the filtered voltages and the voltages in quadrature with the filtered voltages.

The following equation is applied in order to calculate the frequency:

$$f_G = \frac{k_2}{2\pi} \int \left( (v_{\beta}^{mes} - v_{\beta}^{ftr})v_{\alpha q}^{ftr} - (v_{\alpha}^{mes} - v_{\alpha}^{ftr})v_{\beta q}^{ftr} \right) dt$$

The amplitude $V_a$ of the fundamental component is equal to:

$$V_G = \sqrt{v_{\alpha p}^{ftr2} + v_{\beta p}^{ftr2}}$$

The advantage over conventional structures using phase-locked loops (PLL) is that of having low computational complexity.

Figure 5:
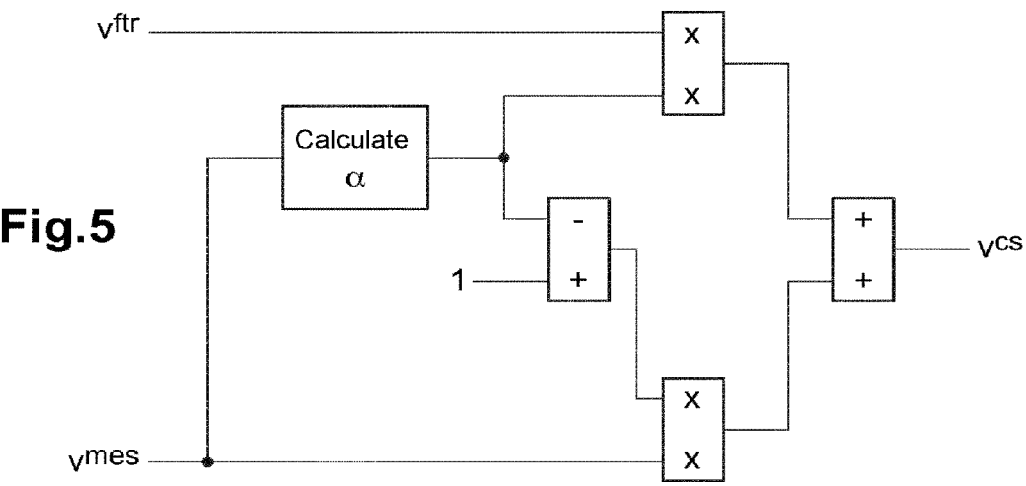
FIG. 5 shows a consolidation step according to the invention.
Figure 6:
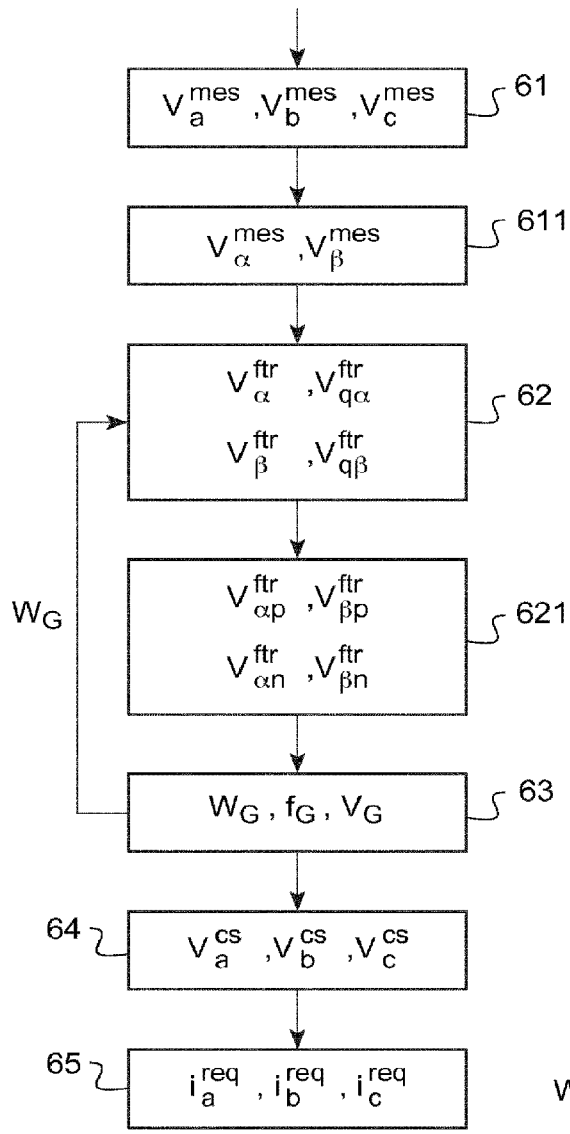
FIG. 6 shows a flowchart of a method according to the invention.

A consolidation step 64 is then implemented, comprising calculating voltages $v_{abc}^{cs}$ consolidated from the measured voltages, as shown in FIG. 5, on the basis of the measured voltages $v_{abc}^{mes}$ and the filtered voltages $v_{abcp}^{ftr}$ of the phase in question.

The aim is to provide consolidated voltages $v_{abc}^{cs}$ close to the low-voltage measured voltages $v_{abc}^{mes}$ thereby ensuring optimized behavior at the zero-crossing of the voltages and that gets closer to the filtered voltages while moving further away from zero, this being obtained using the equation:

$$v_{abc}^{cs} = \alpha v_{abcp}^{ftr} + (1-\alpha)v_{abc}^{mes}$$

where $$\alpha = \begin{cases} \frac{v_{abcp}^{ftr} - V_{th}^{min}}{V_{th}^{max} - V_{th}^{min}} & si V_{th}^{min} < |v_{abc}^{mes}| < V_{th}^{max} \\ 1 & si |v_{abc}^{mes}| \geq V_{th}^{max} \\ 0 & si |v_{abc}^{mes}| \leq V_{th}^{min} \end{cases}$$

Vth are thresholds on the amplitude of the measured voltage.

Vth_max is the maximum threshold beyond which only the filtered voltage $v_{abc}^{ftr}$ is taken.

Vth_min is the minimum threshold below which only the measured voltage $v_{abc}^{mes}$ is taken. These thresholds may be adjusted and adapted by those skilled in the art on the basis of the charging device that is implemented.

Between these two thresholds, a linear combination of the filtered and measured voltages is performed so as to ensure continuity of the signal for smooth behavior.

This consolidation is performed between each phase of the raw three-phase phase voltage $v_a^{mes}$, $v_b^{mes}$, and $v_c^{mes}$ (measured or calculated from the measured phase-to-phase voltage) and its corresponding phase in the phase voltage (forward component), respectively, $v_{ap}^{ftr}$, $v_{bp}^{ftr}$ and $v_{cp}^{ftr}$ calculated from the filtered voltage.

A step of generating 65 the current target values is then performed.

For the current control, the current target value $i_{abc}^{req}$ of each phase is calculated using the following equation:

$$i_{abc}^{req} = I_G \frac{v_{abc}^{cs}}{V_G}$$

where $I_G$ is the peak value of the charging current, calculated from the power $P_{req}$ (power to be transferred by the phase in question) and the amplitude of the (estimated) grid voltage $V_G$, and saturated at a value $I_G^{max}$:

$$I_G = sat\left(\frac{P_{req}}{V_G}, I_G^{max}\right)$$

A rate limiter is furthermore applied to the power target value.

Figure 7:
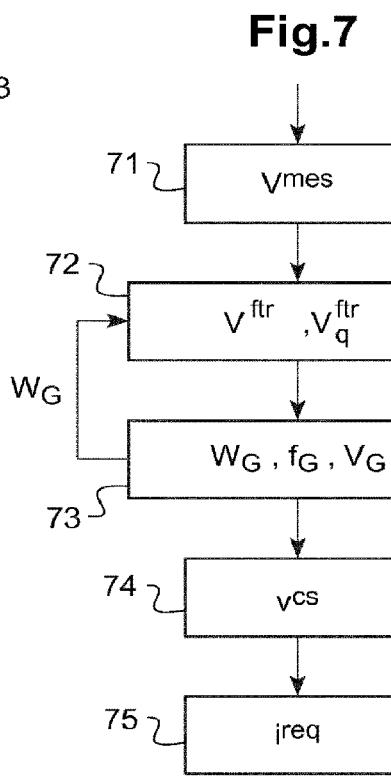
FIG. 7 shows a flowchart of a method according to a second embodiment of the invention.

According to a second embodiment of the invention for a single-phase charging device, the method according to FIG. 7 first of all comprises a step of measuring 71 the single-phase voltage $V_{mes}$.

Next, a filtering step 72 is implemented, using the filtering described for the first embodiment, according to FIG. 3, and in which the measured single-phase voltage $V_{mes}$ is applied directly.

Figure 4:
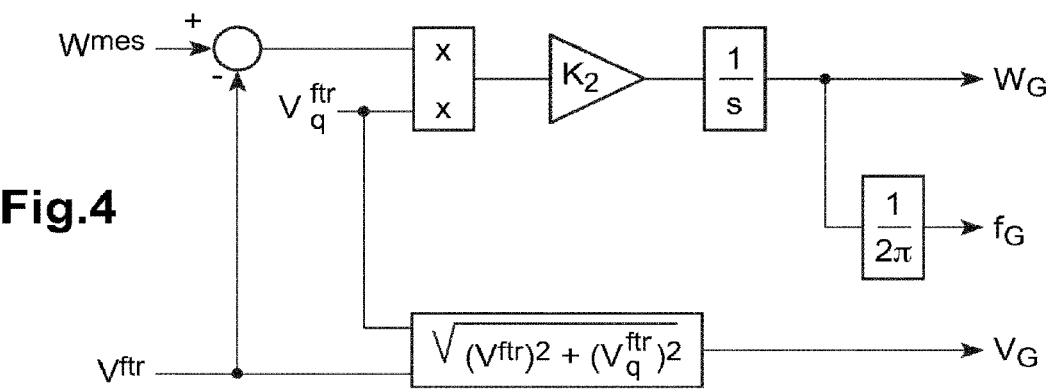
FIG. 4 shows a step of estimating a frequency and the amplitude of said measured voltage according to the invention.

With reference to FIG. 4, the frequency and the amplitude of the grid voltage are then determined 73 on the basis of the measured voltage $V_{mes}$ and the filtered voltage $V_{ftr}$.

The following equation is applied in order to calculate the frequency $f_G$:

$$f_G = \frac{k_2}{2\pi} \int ((v^{mes} - v^{ftr})v_q^{ftr}) dt$$

where $k_2$ is an adjustment gain of the dynamic estimation range of the frequency; the dynamic range varying in proportion to the gain $k_2$.

The angular frequency of the signal $\omega_G$ corresponding to:

$$\omega_G = 2\pi f_G$$

In addition, the voltage $V_G$ of the fundamental component of the voltage is calculated by:

$$V_G = \sqrt{v^{ftr2} + v_q^{ftr2}}$$

FIG. 4 is a logic depiction of these calculations, in which 1/s is the integrator; k2 being outside of the integrator and ½π also being outside of the integrator in order to calculate the frequency; and the signal at the input of k2 corresponding to the multiplication of the two measured $V_{mes}$ and filtered $V_{ftr}$ voltage signals.

Next, the steps of consolidating 74 and calculating the charging current target values 75 are performed in the same way as in the first embodiment, but performing calculation only for the single phase of the single-phase grid.

In other words, in single-phase form, the consolidation is performed between the measured voltage $V_{mes}$ and the filtered voltage $V_{ftr}$.

According to one alternative implementation of the method according to the invention, which may also be applied to the first and the second embodiment described below, a step of estimating the harmonics of the measured voltage is implemented.

Thus, according to this alternative, the number of filters implemented is increased in order to extract certain harmonics of given ranks.

This is possible by multiplying the number of filters according to FIG. 3 that are implemented by n; n being the number of harmonics to be estimated/extracted. Each filter x is then supplied with the measured raw voltage $v^{mes}$, the angular frequency ω is multiplied by the rank h of the harmonic to be estimated/extracted (h×ω in order to extract the harmonic of order h), and the output of the other filters that are used is subtracted from this voltage. In other words, the input of a filter x corresponds to:

$$v_x^{in} = v^{mes} - \sum_{i=1, i \neq x}^{i=n+1} v_i^{ftr}$$

where i=1 corresponds to the fundamental component (often 50 Hz or 60 Hz), and $v_i^{ftr}$ is the output of the filter of order i (i covers all of the other filters except for the filter x in question), corresponding to the output of the filter according to FIG. 3, $ω_G$ is replaced with i×$ω_G$, and by subtracting the results of the calculation performed on all of the harmonics (except i) from the input $v^{mes}$.

In other words, in this alternative embodiment, one filter is used for the fundamental, and h similar filters are used in parallel. For these filters, the angular frequency $ω_G$ is multiplied by the harmonic rank h. Thus, the input $v_x^{in}$ of each filter is equal to the measured voltage $v^{mes}$ minus the results $v_i^{ftr}$ from the previous calculation step of the other filters. For example, for a filter of a harmonic x, the outputs $v_i^{ftr}$ calculated in the previous step are subtracted from the measured voltage $v^{mes}$, with i covering all of the harmonics except for the harmonic x, that is to say except for the output of the filter itself: i=1, i≠x up to i=h+1.

In this case, the output of each filter corresponds to the estimation of the harmonic of rank h, and the estimation of the fundamental component is more precise. This alternative embodiment does not change the other steps of the described embodiments, whether this be in single-phase or in three-phase form.

The invention claimed is:

1. A method of generating a current target value for a charging device connected to an electricity grid, comprising:
   measuring at least one voltage;
   calculating at least one filtered voltage based on said at least one measured voltage and a value of the electrical angular frequency of the electricity grid;
   estimating a frequency and the amplitude of said at least one measured voltage based on said at least one measured voltage and said at least one filtered voltage;
   calculating a consolidated voltage based on said at least one measured voltage and said at least one filtered voltage, said calculating the consolidated voltage providing a consolidated voltage close to said at least one low-voltage measured voltage and close to said at least one filtered voltage while moving further away from zero; and
   generating a current target value based on said consolidated voltage and the estimated amplitude.

2. The method as claimed in claim 1, wherein the method is implemented several successive times, and said value of the electrical angular frequency of the calculating at least one filtered voltage is determined based on a frequency estimated in a previous implementation.

3. The method as claimed in claim 1, wherein the charging device is a three-phase charging device, and the measuring comprises measuring the phase voltages of the three-phase grid and calculating the measured voltages in a two-phase reference frame.

4. The method as claimed in claim 3, further comprising:
   extracting forward components of the filtered voltages,
   wherein said estimating is based on said extracted forward components.

5. The method as claimed in claim 3, wherein the calculating the consolidated voltage is based on values of amplitude thresholds.

6. A device to control a charging device connected to an electricity grid in order to implement the method as claimed in claim 1, the device comprising:
   means for measuring at least one voltage;
   means for filtering said at least one measured voltage based on a value of an electrical angular frequency of the electricity grid;
   means for estimating a frequency and the amplitude of said at least one measured voltage based on said at least one measured voltage and said at least one filtered voltage;
   means for consolidating said at least one measured voltage based on said at least one measured voltage and said at least one filtered voltage, to provide a consolidated voltage close to said at least one low-voltage measured voltage and close to said at least one filtered voltage while moving further away from zero; and
   means for generating a current target value based on said consolidated voltage and the estimated amplitude.

7. An assembly to recharge a battery of electrical accumulators and configured to be connected to an electricity grid, comprising:
   a power factor correction circuit;
   a DC-to-DC converter;
   a battery of electrical accumulators; and
   the control device as claimed in claim 6.

8. The recharging assembly as claimed in claim 7, wherein the power factor correction circuit comprises a Vienna rectifier.

9. The recharging assembly as claimed in claim 7, wherein the assembly is connected to a three-phase or single-phase electricity grid.

10. A motor vehicle comprising:
    the recharging assembly as claimed in claim 7.

* * * * *